A. R. TOWERS.

RECORD AND REFERENCE BOOK.

APPLICATION FILED JULY 19, 1921.

Reissued Sept. 6, 1921.

15,189.

3 SHEETS—SHEET 1.

Inventor:
Augustus R. Towers,
By Cushman Darby & Cushman
Att'ys.

A. R. TOWERS.

RECORD AND REFERENCE BOOK.

APPLICATION FILED JULY 19, 1921.

Reissued Sept. 6, 1921.

15,189.

3 SHEETS—SHEET 2.

A. R. TOWERS.

RECORD AND REFERENCE BOOK.

APPLICATION FILED JULY 19, 1921.

Reissued Sept. 6, 1921.

15,189.

3 SHEETS—SHEET 3.

Inventor:
Augustus R. Towers,

By Cushman, Bryant & Darby
Att'ys.

UNITED STATES PATENT OFFICE.

AUGUSTUS R. TOWERS, OF RICHMOND, VIRGINIA.

RECORD AND REFERENCE BOOK.

15,189. Specification of Reissued Letters Patent. Reissued Sept. 6, 1921.

Original No. 1,329,562, dated February 3, 1920, Serial No. 301,587, filed June 3, 1919. Application for reissue filed July 19, 1921. Serial No. 485,965.

*To all whom it may concern:*

Be it known that I, AUGUSTUS R. TOWERS, a citizen of the United States, residing at Richmond, in the county of Henrico and State of Virginia, have invented new and useful Improvements in Record asd Reference Books, of which the following is a specification.

My invention relates to a new and improved type of record and reference book which is suitable for the reception of entries relating to railroad cars, way-bills, invoices, policies and the like having a distinctive number by which it is recorded and which record data can be ascertained by reference.

More particularly, my invention contemplates certain improvements on the arrangement of reference data disclosed and claimed in United States Letters Patent No. 937,923, issued to Augustus J. Camp, wherein is provided 100 sets of original entry pages which are each subdivided into ten groups of entry spaces in which three printed terminal numerals are used to characterize each entry space of a group. The printed numerals in each group are alike and the numerals in the groups on each set of pages are alike in their two terminal digits but progress successively by groups from 0 to 9 in their initial digits and in which the numerals on the 100 sets of pages are distinguished by progressing numerically by sets of pages in their two terminal digits from 00 to 99. In order that the original entry spaces may be utilized to the maximum extent it is necessary to provide supplement or overflow entry spaces and the Camp patent makes provision for this by utilizing fifty supplement pages in which the entry spaces are characterized by 100 groups of two printed terminal numerals, the numerals being alike in each group and progressing by groups numerically from 00 to 99. In the utilization of such a record book, it has been found that there are certain disadvantages arising out of the segregation and remote location of the supplement pages relatively to the original entry pages, and in addition to that disadvantage is also the fact that it necessitates the provision of extra tabs and cross referencing means for the supplement pages.

One object of my present invention is to rearrange the supplement or overflow entry spaces relatively to their respective original entry spaces to the end that cross referencing may be avoided, separate tabs for the supplement sheets dispensed with, and that the juxtaposition of the supplement to its respective original entry spaces, will increase the speed with which the book may be used, the accuracy of the use, and will also tend to produce the most economical and practical use of the book both for record and for reference purposes. To illustrate this latter advantage more fully by reference to the normal use of books adapted for the record of car movements it should be understood that it is necessary for the clerk to search the preceding entries in the appropriate entry group to see if the number of the car or other things to be recorded already appears, in which event there should be an extension of the movements or data under the original heading rather than the making of a new entry as this arrangement gives the maximum use of the original entry spaces and provides the minimum number of headings thereby simplifying reference searching. The facility with which both the original entries and the supplement may be searched is largely influential as to whether this search will be made and if made will be made carefully. In ordinary practice it is a frequent occurrence that the same car number in the same book will occupy a number of only partially filled entry spaces. In connection with the use of the book for reference purposes this would particularly involve in each case a search of all of the appropriate original and supplement entries, whereas if the particular car number happens to be found at an early point in the original entry spaces the search may not be extended to the supplement because of the inconvenience of turning to it.

I have conceived therefore that the best results will be obtained where the supplement spaces are immediately associated with their respective original entry spaces.

Bearing in mind that the original entry spaces are arranged in 100 sets of ten groups each it is my purpose to provide each group with its respective supplement spaces and in order to obtain the most advantageous arrangement I have further subdivided the supplement spaces for each ten groups so that a supplement space is provided for half of the groups composing each ten related groups. This arrangement is of particular advantage because in the standard type of record and reference book it is possible to display five groups of original entry spaces and a supplement group on a single page, thus bringing all original and supplement entries together and reducing by half the necessary search of the supplement entries heretofore involved for each group of its respective original entry spaces.

A further object of my invention is to provide a novel arrangement of the entry spaces under their respective designating or descriptive headings so that the arrangement of data will be essentially suited for the display on one page of the five original entry groups of spaces and their respective supplement group of spaces.

It is a further object to arrange each group of similar entry spaces in the same vertical column which is subdivided by interposed heading spaces for the numbers of the car, way-bill or the like in which heading spaces three terminal digits are displayed in the original entry columns and two terminal digits are displayed in the supplement entry columns. In such an arrangement the designating numeral entries for the cars, way-bills or the like will be displayed in alinement in the same column so that they can be readily searched for reference purposes and yet the resulting arrangement of the original entry spaces is such as to produce a maximum usefulness of the same as a car record entry book by reason of the fact that the interposed heading spaces descriptive of the car and disclosing its number will require a width which will provide what I have found to be the average maximum number of entry spaces required for car movements between closely associated heading spaces.

My invention in its preferred embodiments only will be better understood by reference to the accompanying drawings, in which:—

Similar reference numerals refer to similar parts throughout the drawings.

Figure 1:
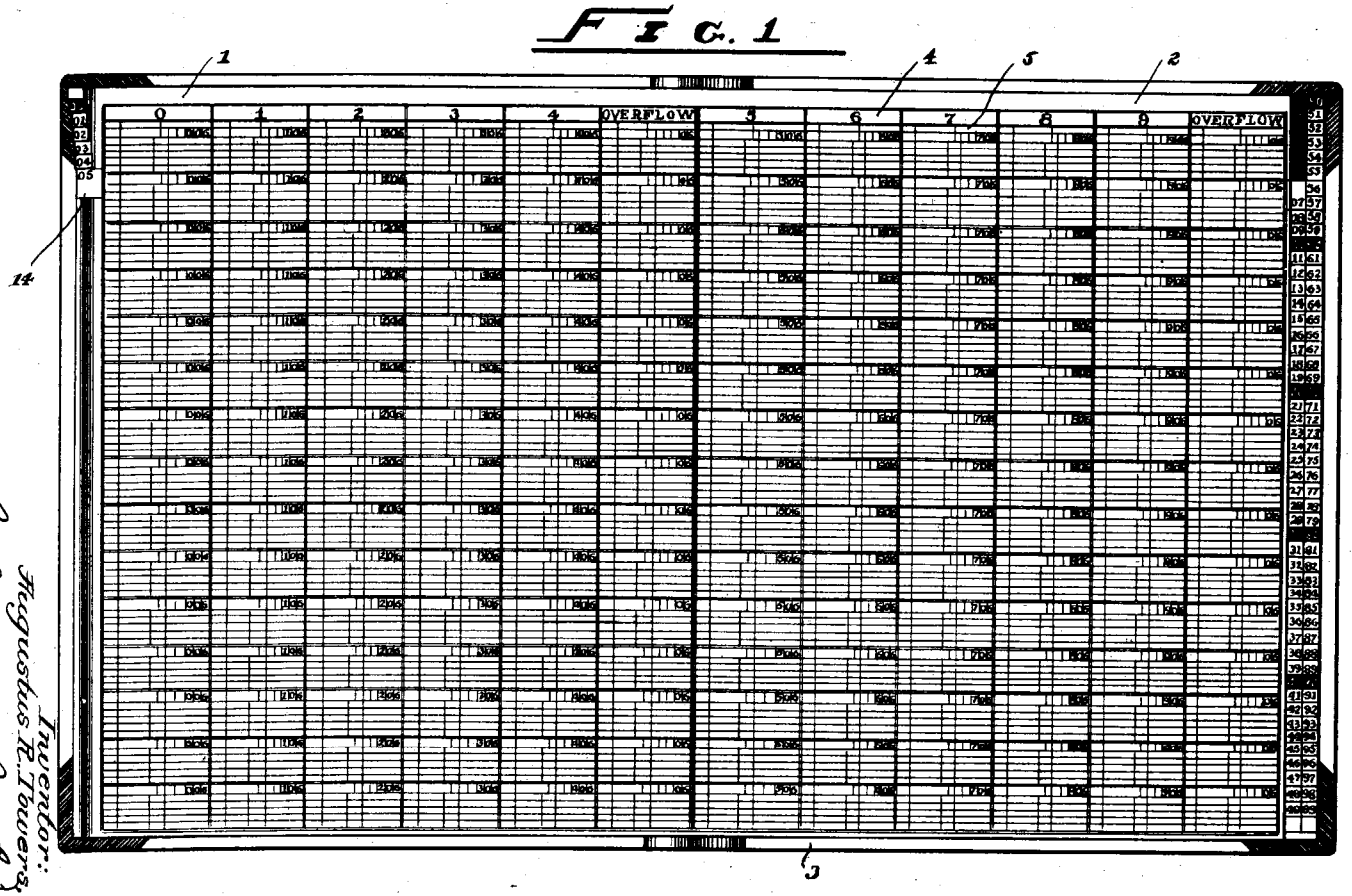
Figure 1 represents a book containing 100 pairs of pages open to show the arrangement of data on a pair of oppositely facing pages which are ruled and marked for car shipment data, the printing with the exception of the numerals being omitted for the sake of clearness.
Figure 2:
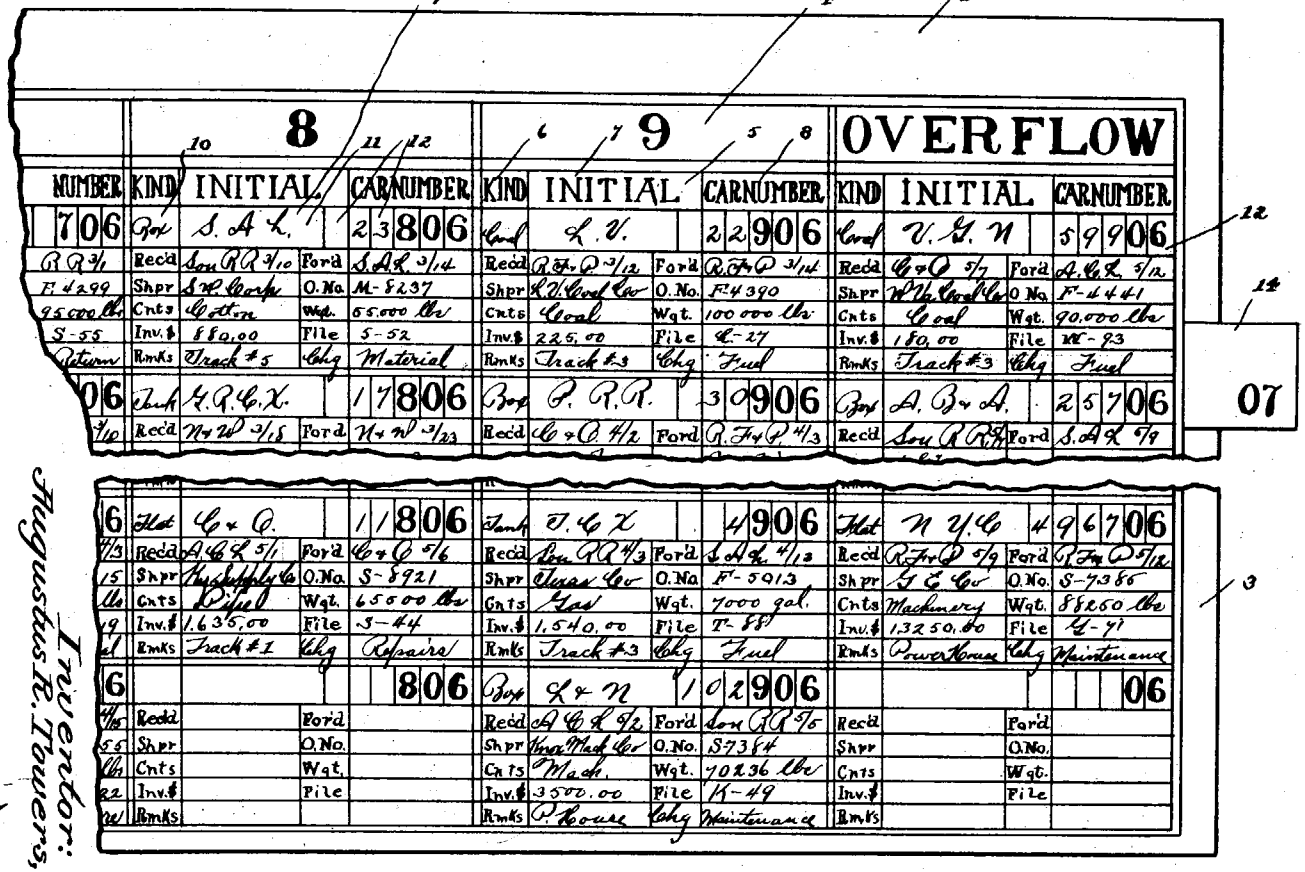
Fig. 2 is an enlarged view of a portion of one of the sheets illustrated in Fig. 1 with suitable entries therein to illustrate the use of the book.

In the embodiment of my invention illustrated in Figs. 1 and 2, I show a record book comprising 100 sheets suitably bound so as to form a book comprising 100 pairs of oppositely facing pages 1 and 2. The pages may be bound in permanent backs 3 or in any other suitable manner. Each page is ruled to provide a horizontal top column 4 and is ruled vertically to provide six main vertical columns which, on page 1 of each pair of pages, are designated by the heading numerals 0, 1, 2, 3 and 4 reading from left to right, and the sixth column is headed "Overflow." On the page designated 2 of each pair, the columns are headed, reading from left to right, 5, 6, 7, 8 and 9 and the last column is headed "Overflow." These main vertical columns extend from top to bottom of the page and are subdivided below the top horizontal column containing the designating numerals by a second horizontal heading column 5. This heading column 5 is further subdivided to provide in each main column an entry space 6, in which is printed the word "Kind" or the equivalent, an entry space 7 in which is printed the word "Initial" or the equivalent, and an entry space 8 in which are printed the words "Car number" or the equivalent. Below the main heading column 5, the space in the several main vertical columns is subdivided into blocks of entry spaces, each block comprising a top heading column 9 subdivided to provide an entry space 10 at the left under the main heading "Kind," an entry space 11 under the main heading "Initial," and a group of numeral entry spaces 12 under the main heading "Car number." In the three terminal spaces 12 in each block are printed the designating or characterizing reference numerals for that particular block. These numerals in the same vertical column are alike and the figures in the several columns on a pair of oppositely facing pages differ by having their initial digit progress numerically by columns from 0 to 9. In thus progressing the overflow column is skipped on each page and in the overflow column only the same two reference or designating numerals are printed as appear in the last two spaces 12 in each book of spaces on its respective page, these two numerals being the same as all of the other two terminal numerals printed on the same page. Below the heading column 9 in each block of entry spaces I provide further subdivisions for the purpose of entering the data desired in respect of the subject matter entered in the heading column.

As shown in Figs. 1 and 2 the book is adapted for appropriate data to be kept by commercial plants for car shipments, but it will be understood that this particular data and the arrangement of entry spaces in each block will be appropriate to the subject matter to be recorded. Each block of entry spaces, as shown, is subdivided into five horizontal columns intersected by four vertical sub-columns, the left vertical sub-column containing in the spaces formed by the intersecting horizontal columns the following headings "Rec'd.", "Shpr.", "Cnt." "Inv. $" and "Rmks.", the above being abbreviated respectively for the words "received," "shipper," "contents," "amount of invoice" and "remarks." The third vertical sub-column of the entry space in each block contains the following headings "For'd.", "O. No.", "Wgt.", "File" and a blank for the same horizontal column with the bottom heading "Rmks." of the first vertical sub-column. The headings in this column are abbreviated for the words "forward," "order number," "weight" and "file number." Each block of entry spaces will be subdivided from the next lower block by a double line or equivalent separating mark and the main vertical columns headed by the numerals are likewise separated by double lines or the equivalent so that each block of entry spaces is clearly defined on all sides and each block contains its respective heading column 9 and as displayed therein its respective printed terminal reference numerals which in the illustration in Fig. 2 are "706," "806," "906," for the three original main entry columns shown and "06" for the overflow column shown.

In utilizing this book the car number is classified by its three terminal digits, the two terminal digits indicating the pair of pages on which the entry should be made and on which all of the printed reference numerals will be characterized by the same two terminal numerals as that of the car or other article to be recorded. Having turned to the appropriate pair of pages, the entry is made in the main vertical column having the heading numeral corresponding to the third from the last digit in the number to be recorded. Thus, for instance, if the car in question should be a Seaboard Air Line box car No. 23806, the book would be opened to the seventh pair of pages and the entry would be made in the vertical column headed by the digit 8, the word "Box" being written under the main heading "Kind" and the letters "S A L" being written in under the main heading "initial" and the numbers "23" being written in in the spaces 12 preceding the printed numbers "806." Entries are made in the first vacant heading column 9 and the block of entry spaces thereunder are filled in with data appropriate to the car in question. When all of the heading spaces in a given vertical column have been filled, any additional headings to be entered thereafter are made in the overflow column, in which the heading columns 9 are purposely provided with only the two terminal digits which characterize all of the original entry numerals displayed on that page, thereby permitting the overflow column to receive overflow entries from any or all of the main vertical columns on its respective page.

Figure 3:
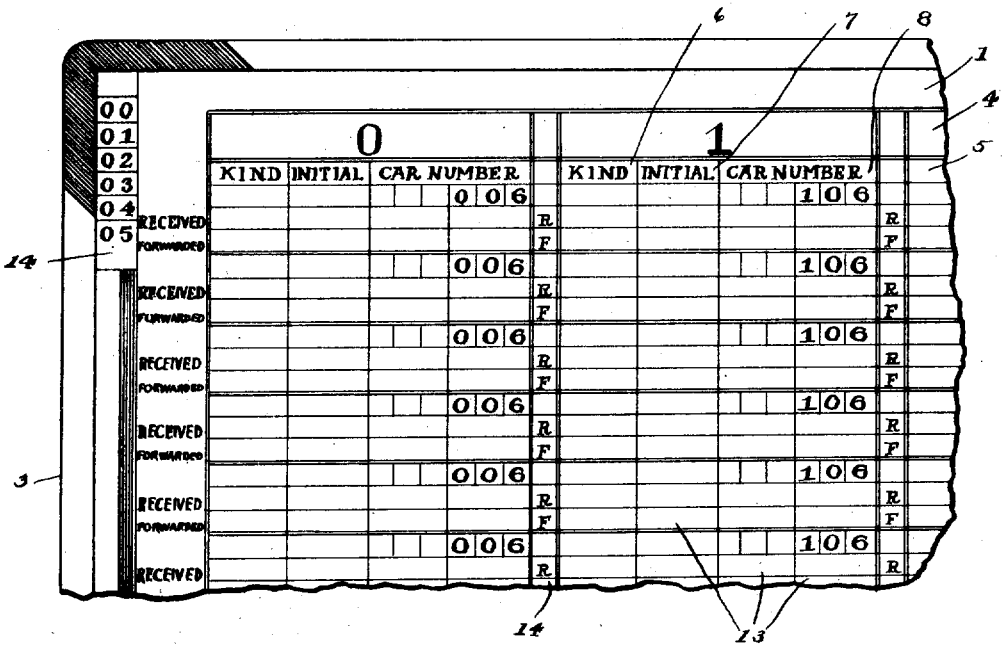
Fig. 3 is a detail view of a sheet subdivided for the most convenient arrangement of data relating to car movements.

In Fig. 3 I have illustrated my invention as adapted for a car movement record and here we have the same arrangement of vertical and overflow columns and also the same column 5, except that the car number space 8 is wide enough to occupy one-half of the width of the main vertical column and below the horizontal column 9 the entry space is subdivided into vertical columns which in turn are again subdivided into two horizontal columns, thus providing eight equal entry spaces. These eight entry spaces 13 comprise with the heading column the block of entry spaces to receive the car movement entries.

Each of the horizontal columns into which the entry spaces of the blocks are subdivided, are headed at the left hand end of the page by the words "Received" and "Forwarded" and in order to avoid possible error in the location of entries the two lines which divide the main vertical columns are spaced wide enough to form a very narrow column 14 in which the initials "R" and "F" are entered as headings for the car movement spaces in each block. The utilization of this car movement record is identical with that already described except that the spaces 13, instead of receiving descriptive matter relative to the car, receive entries defining its movements.

It will be noted that the printed car record numbers are displayed in alining columns which intersect the right hand half of each block of entry spaces, and it follows therefore that a car must have more than four movements recorded in its "Received" and "Forwarded" spaces before the entries will intervene between the car numbers. This is of advantage in facilitating reference work and as my experience has shown a majority of the car movements are less than five entries, my arrangement is therefore of peculiar advantage to a car record book.

The six columns on each page are preferably vertical but may be otherwise arranged according to the data to be entered.

Having thus described my invention, what I claim as new and desire to secure by Letters Patent, is:

1. A record and reference book comprising 100 pairs of oppositely facing pages, each pair of pages being subdivided into ten groups of entry spaces and two groups of supplement or overflow entry spaces, the spaces on each page of a pair being arranged in five groups of original entry spaces and one group of supplement entry spaces, the entry spaces of all groups on a page being characterized by two like terminal digits, and the numbers distinguishing the original entry spaces on said page being further characterized by the prefix of a digit which progresses numerically by groups from 0 to 9 for the groups on each pair of pages.

2. In a record and reference book of the character described, 100 pairs of oppositely facing entry pages, each page being ruled into six entry columns, five of said columns on each page comprising original entry spaces and having three printed designating groups of numerals which are similar in each column and which are distinguished by having the initial digits in each column of original entry spaces progressing by columns numerically from 0 to 9, the sixth column on each page being provided with supplement entry spaces adapted to receive the overflow entries from the original entry spaces on the same page.

3. In a record and reference book of the character described, the combination of 100 pairs of oppositely facing entry pages, each entry page being ruled into six columns, said columns being ruled into separate groups of entry spaces, each group having heading spaces in which printed reference numerals are displayed, there being three reference numerals in five columns on each page, the reference numerals in each column being alike and the reference numerals in the columns of each pair of pages being distinguished by the prefix of an additional numeral which progresses numerically by columns from 0 to 9, the reference numbers on the successive pairs of pages being distinguished by their two terminal digits which progress numerically by pairs of pages from 00 to 99, the sixth column on each page being adapted to receive overflow entries from the other five columns on the same page.

4. In a record and reference book of the character described, a series of pages which are ruled into vertical main columns, each of said main columns being subdivided by transverse rulings into a plurality of blocks of original entry spaces, the several blocks of spaces in a vertical column being further subdivided by vertical sub-columns having heads to designate the kind, character and the number of the subject to which the entries pertain, each block of entry spaces being divided by horizontal rulings into a plurality of sub-columns intersecting the vertical sub-columns, the upper of said horizontal sub-columns in each block of spaces containing printed terminal digits which correspond throughout the main vertical column, the lower horizontal sub-columns in each block of spaces being appropriately headed and subdivided for the reception of entries relating to the subject described in its top horizontal sub-column.

5. In a record and reference book of the character described, a page subdivided into vertical columns which are further subdivided by vertical sub-columns appropriately headed to describe the character and number of the subject matter to be entered, the main vertical columns being subdivided by horizontal rulings into similar blocks of entry spaces which are intersected by the vertical sub-columns and which are subdivided into a horizontal heading column and a plurality of horizontal sub-entry columns under said heading column, and a plurality of terminal digits of the designating number of the subject to be entered in each block of entry spaces being printed in its heading column with appropriate spaces for the insertion of initial digits, the terminal digits printed in the book progressing by groups of blocks successively from 00 to 99.

6. A record and reference book comprising 100 pairs of oppositely facing pages, each pair of pages being subdivided into ten groups of entry spaces and at least one group of supplement or overflow entry spaces, the spaces for both the original and overflow entries being characterized by at least two like terminal digits, and the numbers distinguishing the original entry spaces on each pair of pages being further characterized by the prefix of a digit which progresses numerically by groups from 0 to 9 for the groups on each pair of pages.

In testimony whereof I have hereunto set my hand.

AUGUSTUS R. TOWERS.